United States Patent
Da Silva et al.

(10) Patent No.: US 7,413,585 B2
(45) Date of Patent: Aug. 19, 2008

(54) CLOSED PRESSURE-KEEPING SYSTEM FOR LIQUID HYDROGEN STORAGE

(75) Inventors: Jader Matos Da Silva, Mainz (DE); Markus Lindner, Mainz (DE); Rainer Immel, Dexheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 499 days.

(21) Appl. No.: 11/105,739

(22) Filed: Apr. 14, 2005

(65) Prior Publication Data

US 2006/0230679 A1  Oct. 19, 2006

(51) Int. Cl.
*F17B 1/00* (2006.01)
*F17B 1/14* (2006.01)
*F17D 1/04* (2006.01)
*F17D 3/00* (2006.01)
*F17C 1/00* (2006.01)
*F17C 3/08* (2006.01)
*B65B 31/00* (2006.01)
*B01J 8/04* (2006.01)

(52) U.S. Cl. ............... 48/174; 48/175; 48/190; 48/191; 48/192; 220/560.08; 220/720; 422/107; 422/108; 422/190; 422/198; 422/199; 141/4; 141/11; 141/18; 62/45.1

(58) Field of Classification Search ............... 48/174, 48/190, 191, 192, 127.3; 422/190, 198, 199, 422/107, 108; 165/75, 10; 220/560.08, 720; 62/54.1, 47.1, 48.1, 50.1, 50.2, 50.4, 50.7, 62/53.2, 54.2, 54.3, 45.1; 141/4, 11, 18

See application file for complete search history.

(56) References Cited

U.S. PATENT DOCUMENTS

| | | | | |
|---|---|---|---|---|
| 4,080,800 | A * | 3/1978 | Spaulding et al. | 62/50.4 |
| 4,625,753 | A * | 12/1986 | Gustafson | 137/202 |
| 4,956,975 | A * | 9/1990 | Gustafson | 62/50.7 |
| 5,243,821 | A * | 9/1993 | Schuck et al. | 62/50.6 |
| 5,421,161 | A * | 6/1995 | Gustafson | 62/7 |
| 5,520,000 | A * | 5/1996 | Pevzner | 62/48.1 |
| 5,687,776 | A * | 11/1997 | Forgash et al. | 141/11 |
| 6,810,924 | B2 * | 11/2004 | White | 141/82 |
| 7,073,339 | B2 * | 7/2006 | Hall et al. | 62/48.1 |
| 2004/0231411 | A1 * | 11/2004 | Drube et al. | 73/195 |
| 2006/0026900 | A1 * | 2/2006 | Jang | 48/190 |

OTHER PUBLICATIONS

Description of Hydrogen Storage Systems-Method A and Method B.

* cited by examiner

*Primary Examiner*—Walter D. Griffin
*Assistant Examiner*—Huy-Tram Nguyen

(57) ABSTRACT

A pressure maintaining system for a hydrogen storage system includes a hydrogen supply feed that enables a hydrogen flow from the hydrogen storage system. A liquid phase hydrogen feed enables a liquid phase hydrogen flow to the hydrogen supply feed. A gas phase hydrogen feed enables a gas phase hydrogen flow to the hydrogen supply feed. A check valve enables fluid communication from the hydrogen supply feed to the liquid phase hydrogen feed when a pressure within the hydrogen supply feed is greater than a threshold pressure.

18 Claims, 3 Drawing Sheets

CLOSED PRESSURE-KEEPING SYSTEM FOR LIQUID HYDROGEN STORAGE

FIELD OF THE INVENTION

The present invention relates to hydrogen storage, and more particularly to a pressure maintaining system for hydrogen storage.

BACKGROUND OF THE INVENTION

Fuel cell systems are increasingly used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a membrane that is sandwiched between an anode and a cathode. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

Hydrogen storage systems have been developed to provide hydrogen to the fuel cell stack. The hydrogen is generally stored in a storage vessel in gas and liquid phases under pressure and at low temperature. In some instances, gaseous hydrogen must be recirculated back to the storage vessel. However, reintroduction of gaseous hydrogen into the storage vessel can significantly increase the system pressure of the storage vessel. If the system pressure is too high, a pressure release device is activated and gaseous hydrogen is vented to atmosphere.

One traditional hydrogen storage system includes a cryo-shut-off valve that enables withdrawal of hydrogen (i.e., liquid) from the storage vessel. The cryo-valve is disposed within a vacuum isolated housing and includes a return device. The return device enables gaseous hydrogen to flow back into the hydrogen storage tank. The return device is activated when a set pressure is reached. Cryo-valves that include the return device are complicated and expensive.

Another traditional hydrogen storage system includes a check valve that is external to the vacuum isolated housing. The check valve enables gaseous hydrogen to flow back into the gas phase hydrogen within the storage vessel. As discussed above, reintroducing gas phase hydrogen into the storage vessel significantly increases the system pressure.

SUMMARY OF THE INVENTION

Accordingly, the present invention provides a pressure maintaining system for a hydrogen storage system. The pressure maintaining system includes a hydrogen supply feed that regulates a hydrogen flow from the hydrogen storage system. A liquid phase hydrogen feed regulates a liquid phase hydrogen flow to the hydrogen supply feed. A gas phase hydrogen feed regulates a gas phase hydrogen flow to the hydrogen supply feed. A check valve enables fluid communication from the hydrogen supply feed to the liquid phase hydrogen feed when a pressure within the hydrogen supply feed is greater than a threshold pressure.

In one feature, the pressure maintaining system further includes a vacuum isolation housing. The liquid phase hydrogen feed and the gas phase hydrogen feed are disposed within the vacuum isolation housing and the hydrogen supply feed extends from the vacuum isolation housing.

In other features, the pressure maintaining system further includes an insulation housing within which the liquid phase hydrogen feed and the gas phase hydrogen feed are disposed. The insulation housing can be a vacuum insulation housing.

In other features, the liquid phase hydrogen feed includes a conduit and a valve that enables the liquid phase hydrogen to flow through the conduit. The check valve enables fluid communication from the hydrogen supply feed to the liquid phase hydrogen feed at a point upstream of the valve when the pressure within the hydrogen supply feed is greater than the threshold pressure.

In another feature, the hydrogen supply feed further comprises a heat transfer device that transfers heat to one of the gas phase hydrogen flow and the liquid phase hydrogen flow from the gas phase hydrogen feed and the liquid phase hydrogen feed, respectively.

In still another feature, the hydrogen supply feed further includes a shut-off valve that is operable between an open position and a closed position to regulate the hydrogen flow.

In yet another feature, the pressure maintaining system further includes a safety valve that is in fluid communication with the gas phase hydrogen feed. The safety valve is operable to reduce a storage pressure when the storage pressure exceeds a tank threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
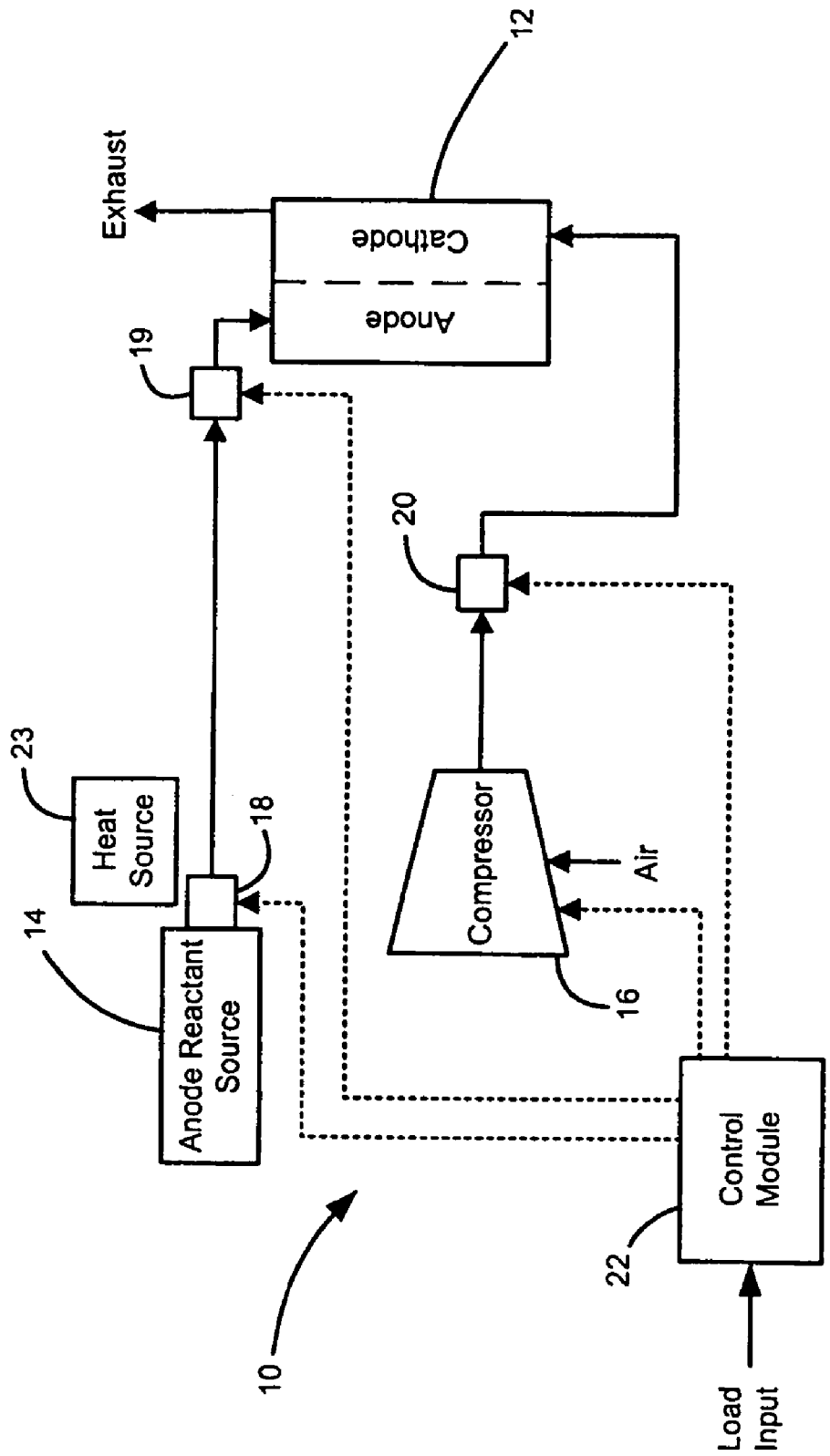
FIG. 1 is a schematic illustration of an exemplary fuel cell system including a hydrogen storage system according to the present invention.

Referring now to FIG. 1, an exemplary fuel cell system 10 is illustrated. The fuel cell system 10 includes a fuel cell stack 12, a hydrogen storage system 14 and a compressor 16. The fuel cell system 10 further includes a pressure maintaining system 18 and a pressure management system 19. The pressure maintaining system 18 regulates the pressure within the hydrogen storage system 14 and operates independent of the fuel cell stack 12 (i.e., regardless of whether the fuel cell stack is ON or OFF), as discussed in further detail below. The pressure management system 19 regulates the pressure of the hydrogen provided to the fuel cell stack 12 and operates when the fuel cell stack 12 is ON.

The compressor 16 provides pressurized, oxygen-rich air to a cathode side of the fuel cell stack 12 through a regulator 20. Reactions between the hydrogen and oxygen within the fuel cell stack 12 generate electrical energy that is used to drive a load (not shown). A control module 22 regulates overall operation of the fuel cell system based on a load input and operating parameters of the fuel cell system. The load input indicates the desired electrical energy output from the fuel cell stack 12. For example, in the case of a vehicle, the load input could include a throttle.

Figure 2:
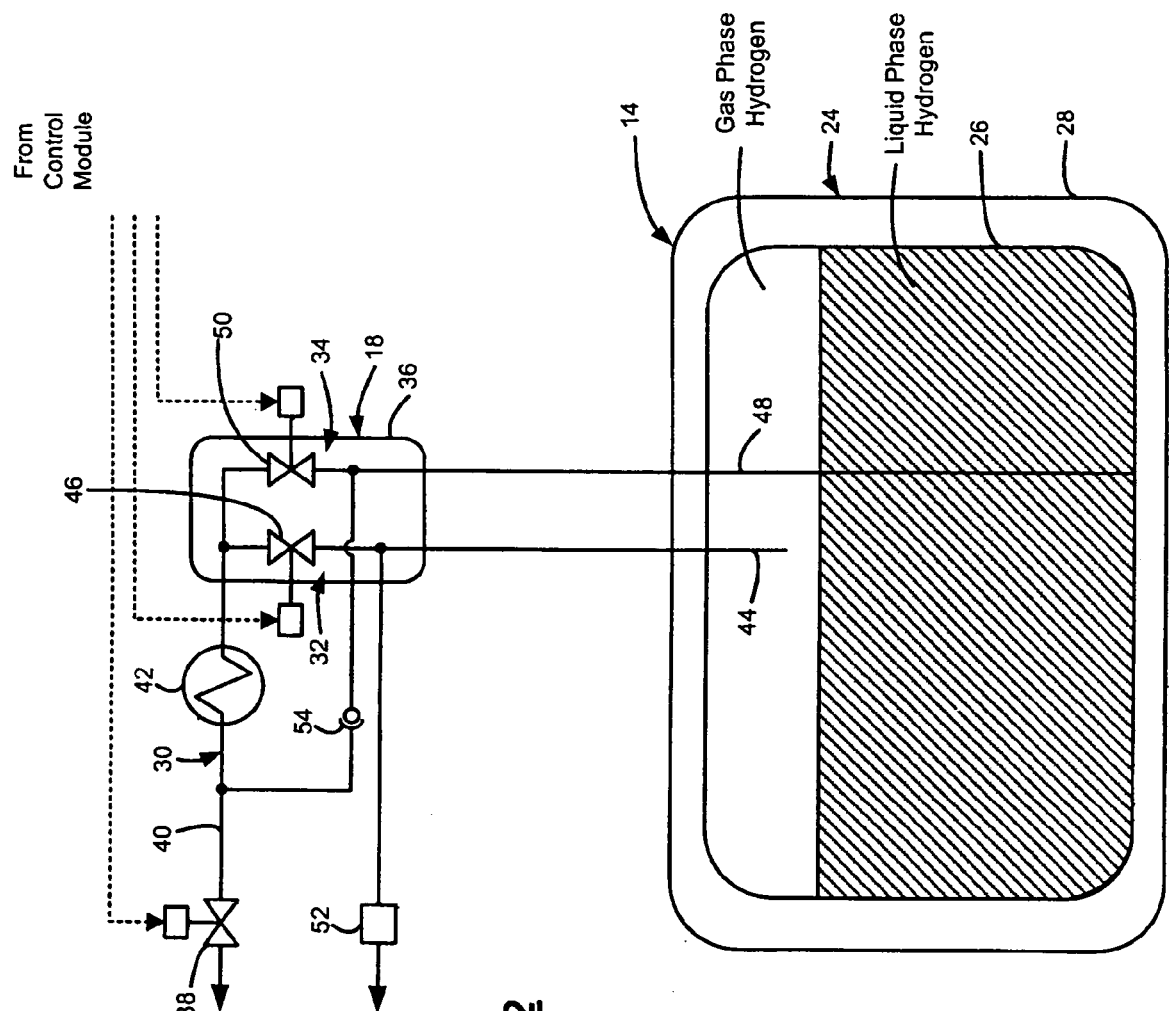
FIG. 2 is a schematic illustration of the hydrogen storage system including a pressure maintaining system according to the present invention.

Referring now to FIG. 2, the hydrogen storage system 14 includes a storage vessel 24 that has an interior vessel structure 26 vacuum isolated within an exterior vessel structure 28. Multi-phase or high-density hydrogen fluid is stored under pressure within the storage vessel 24. More specifically, gas phase and liquid phase hydrogen are stored within the storage vessel 24. The pressure within the storage vessel is generally maintained at a desired system pressure (e.g., between 100 kPa and 4500 kPa).

The system pressure is affected by the partial pressures of the liquid phase hydrogen and the gas phase hydrogen. Gas phase hydrogen and liquid phase hydrogen are generally at an equilibrium pressure at a corresponding equilibrium temperature, which is determined based on the two-phase diagram of the liquefied hydrogen. If heat entry into the liquid and gas phase hydrogen within the storage vessel 24 increases, a portion of the liquid phase hydrogen converts to gas phase hydrogen. As a result, the hydrogen storage system pressure increases and the stored liquid hydrogen can cross the two-phase boundaries. In this case, a high-density hydrogen fluid is stored within the vessel 24 without liquid/gas phases. A significant pressure increase can occur, depending on the amount of liquid phase hydrogen that converts to gas phase hydrogen.

The pressure maintaining system 18 regulates pressures within the hydrogen storage system 14 during hydrogen extraction. The pressure maintaining system 18 includes a hydrogen supply feed 30, a gas phase hydrogen feed 32 and a liquid phase hydrogen feed 34. The gas phase hydrogen feed 32 and the liquid phase hydrogen feed 34 are enclosed within insulated housing 36. The insulated housing 36 can include, but is not limited to, a vacuum isolation housing. The hydrogen supply feed 30 includes a shut-off valve 38 and a conduit 40 that extends into the housing 36. The shut-off valve 38 is operable in an open position and a closed position and is operated based on a control signal from the control module 22. In the open position, a hydrogen flow from the storage vessel 24 is enabled. In the closed position, the hydrogen flow is inhibited. A heat transfer device 42 is also included and enables heat transfer to the hydrogen flowing through the hydrogen supply feed 30. The heat transfer device 42 can include a heating mechanism (e.g., coolant system or electric heater) or a heat exchanger 23 (see FIG. 1). The heat transfer device 42 heats the hydrogen flow so that it is in the gas phase and is at a desired temperature as it flows from the hydrogen storage system 14.

The gas phase hydrogen feed 32 includes a conduit 44 that extends into the gas phase hydrogen within the storage vessel 24 and a valve 46 that enables flow of gas phase hydrogen from the storage vessel 24 to the hydrogen supply feed 30 when in an open position. The liquid phase hydrogen feed 34 includes a conduit 48 that extends into the liquid phase hydrogen (represented by the shaded region in FIG. 2) and a valve 50 that enables flow of liquid phase hydrogen from the storage vessel 24 to the hydrogen supply feed 30 when in an open position. The valves 46,50 are regulated based on control signals generated by the control module 22. More specifically, when the shut-off valve 38 is in the open position and hydrogen is flowing from the hydrogen storage system 24, the valves 46,50 are regulated to maintain the system pressure of the storage vessel 24. For example, if the system pressure is to be more drastically decreased, the valve 46 enables a gas phase hydrogen flow from the storage vessel 24. In other cases, the valve 50 enables a liquid phase hydrogen flow from the storage vessel 24. In both cases, the heat transfer device 42 enables heating of the gas and a state change from the liquid to the gas phase for supply at a desired temperature to the fuel cell stack 12.

A safety valve 52 is also included and is in fluid communication with the gas phase hydrogen feed 44. The safety valve 52 prevents the system pressure of the storage vessel 24 from exceeding a threshold storage pressure (e.g., 1000 kPa). More specifically, the safety valve 52 is designed to vent gas phase hydrogen to atmosphere if the system pressure achieves the threshold storage pressure. In this manner, the system pressure is reduced or maintained.

A check valve 54 is disposed between the hydrogen supply feed 30 and the liquid phase hydrogen feed 34 according to the present invention. The check valve 54 is a one-way valve that enables fluid communication from the hydrogen supply feed 30 over the liquid phase hydrogen feed 34 into the hydrogen storage vessel 24. In some instances, a pressure increase occurs within the hydrogen supply feed 30. This typically occurs immediately after shut-down of the fuel cell system 10 and also during vehicle parking when the shut-off valve 38 is in the closed position and residual hydrogen within the hydrogen supply feed 30 is heated by natural heat transfer from the environment or from the residual heat contained in the heating device 42. The greater the temperature of the residual hydrogen, the greater the pressure within the hydrogen supply feed 30. If the pressure within the hydrogen supply feed 30 achieves a threshold pressure, the check valve 54 is pushed open and residual gas phase hydrogen is vented as a backflow over the liquid phase hydrogen feed 34 into the hydrogen storage vessel 24. In this manner, the pressure within the hydrogen supply feed 30 is reduced or maintained and damage to the components thereof is prohibited. Because the liquid phase hydrogen within the liquid phase hydrogen feed 34 is cooler than the backflow gas phase hydrogen, the gas phase hydrogen is cooled and partially changes to the liquid phase.

Figure 3:
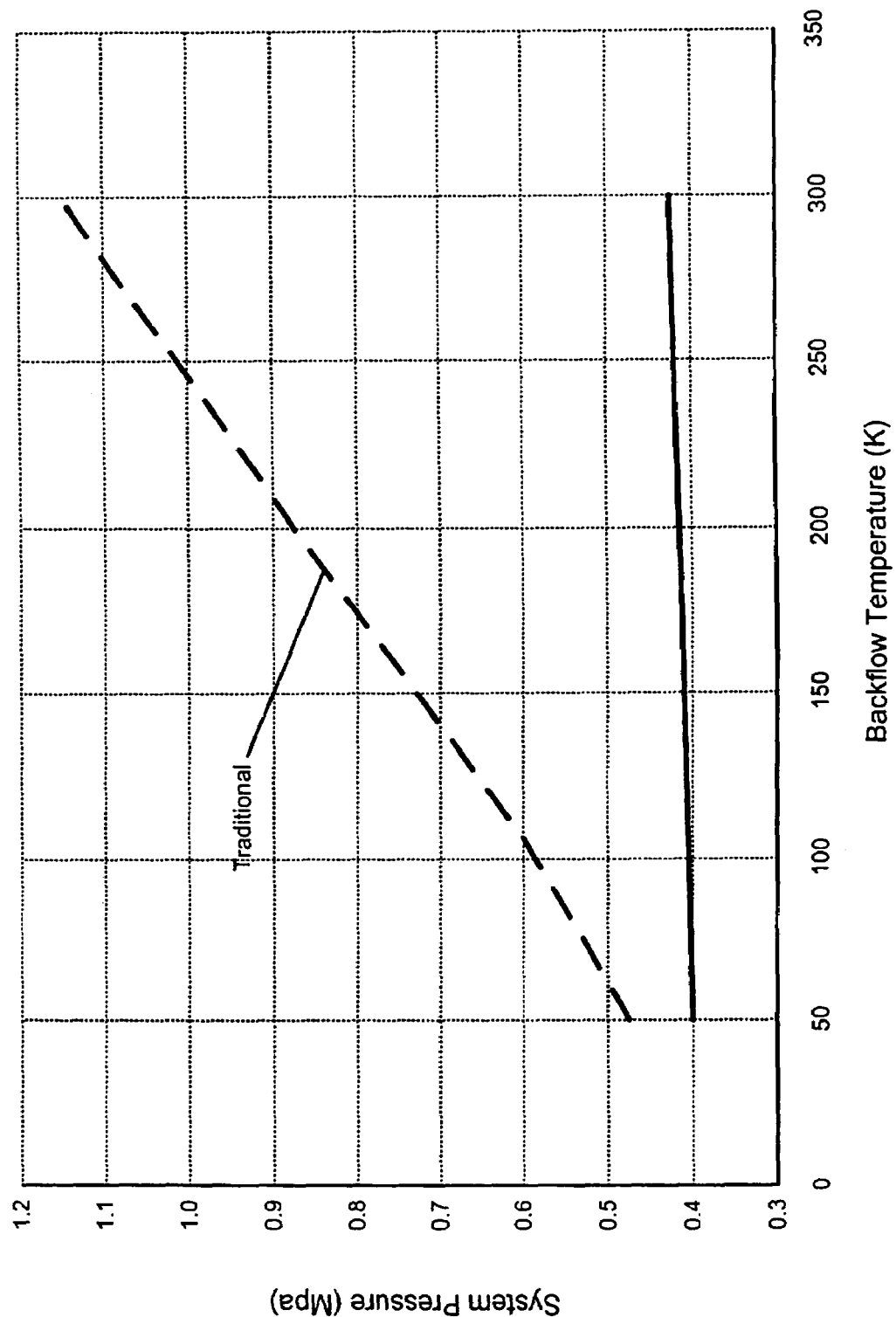
FIG. 3 is a graph illustrating system pressure versus back-flow temperature for a traditional hydrogen storage system and the hydrogen storage system of the present invention.

Referring now to FIG. 3, the backflow hydrogen, now in the liquid phase, is reintroduced to the storage vessel 24 through the conduit 48 with a minimal increase in system pressure. In this manner, the overall system pressure of the storage vessel 24 is only slightly increased as compared with traditional hydrogen storage systems, which reintroduce gas phase hydrogen into the liquid phase of the storage vessel 24. Venting the residual backflow gas into the liquid phase hydrogen in the storage vessel 24 will cause a smaller pressure increase in the storage vessel 24 than venting the residual backflow gas into the gaseous phase hydrogen in the storage vessel 24. This is because venting the residual backflow gas into the liquid phase hydrogen in the storage vessel 24 enables a portion of the backflow gas to change to liquid phase. Venting the residual backflow gas into the gaseous phase hydrogen in the storage vessel 24 does not offer this option and therefore pressure would more significantly increase in the storage vessel 24.

The graph of FIG. 3 illustrates storage pressure versus backflow temperature for traditional hydrogen storage systems and the hydrogen storage system 14, which incorporates the check valve enabled fluid communication from the hydrogen supply fed to the liquid phase hydrogen feed of the present invention. On the x-axis the temperature of the backflow hydrogen gas is varied and the y-axis shows the system pressure after a certain amount of residual gas has been introduced. It can be concluded that the system pressure increases with increasing backflow gas temperature. It can be further concluded that the system pressure increases less if the backflow hydrogen is introduced into the liquid phase compared to being introduced into the gas phase. As a result, there are less instances of venting hydrogen through the safety valve with the hydrogen storage system 14 than traditional hydrogen storage systems. In this manner, hydrogen is spared and there is a reduced safety risk due to the vented hydrogen.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pressure maintaining system for a hydrogen storage system, comprising:
    a hydrogen supply feed that enables a hydrogen flow from said hydrogen storage system to a fuel cell stack;
    a liquid phase hydrogen feed that enables a liquid phase hydrogen flow to said hydrogen supply feed;
    a gas phase hydrogen feed that enables a gas phase hydrogen flow to said hydrogen supply feed, wherein said hydrogen supply feed includes a heat transfer device that transfers heat to one of said gas phase hydrogen flow and said liquid phase hydrogen flow; and
    a check valve that enables fluid communication from said hydrogen supply feed at a point downstream of said heat transfer device over said liquid phase hydrogen feed into said hydrogen storage system when a pressure within said hydrogen supply feed is greater than a threshold pressure.

2. The pressure maintaining system of claim 1 further comprising an insulated housing, wherein said liquid phase hydrogen feed and said gas phase hydrogen feed are disposed within said insulated housing and said hydrogen supply feed extends from said insulated housing.

3. The pressure maintaining system of claim 1 wherein said liquid phase hydrogen feed includes a conduit and a valve that enables said liquid phase hydrogen flow through said conduit.

4. The pressure maintaining system of claim 3 wherein said check valve enables fluid communication from said hydrogen supply feed to said liquid phase hydrogen feed at a point upstream of said valve when said pressure within said hydrogen supply feed is greater than said threshold pressure.

5. The pressure maintaining system of claim 1 wherein said heat is transferred from said gas phase hydrogen feed and said liquid phase hydrogen feed, respectively.

6. The pressure maintaining system of claim 1 wherein said heat is transferred from a coolant system.

7. The pressure maintaining system of claim 1 wherein said heat is transferred from an electrical heating system.

8. The pressure maintaining system of claim 1 wherein said hydrogen supply feed further comprises a shut-off valve that is operable between an open position and a closed position to regulate said hydrogen flow.

9. The pressure maintaining system of claim 1 further comprising a safety valve that is in fluid communication over said gas phase hydrogen feed, wherein said safety valve is operable to reduce a storage pressure when said storage pressure exceeds a tank threshold.

10. A hydrogen storage system that stores liquid phase hydrogen and gas phase hydrogen within a two-phase diagram of liquefied hydrogen or high-density hydrogen fluid outside of a two-phase boundary, comprising:
    a storage vessel; and
    a pressure maintaining system that regulates a hydrogen flow from said storage vessel and that comprises:
    a hydrogen supply feed that enables said hydrogen flow to a fuel cell stack;
    a liquid phase hydrogen feed that enables a liquid phase hydrogen flow to said hydrogen supply feed;
    a gas phase hydrogen feed that enables a gas phase hydrogen flow to said hydrogen supply feed, wherein said hydrogen supply feed includes a heat transfer device that transfers heat to one of said gas phase hydrogen flow and said liquid phase hydrogen flow; and
    a check valve that enables fluid communication from said hydrogen supply feed at a point downstream of said heat transfer device to said liquid phase hydrogen feed when a supply pressure within said hydrogen supply feed is greater than a threshold pressure.

11. The hydrogen storage system of claim 10 wherein said pressure maintaining system further comprises an insulated housing that houses said liquid phase hydrogen feed and said gas phase hydrogen feed and wherein said hydrogen supply feed extends from said insulated housing.

12. The hydrogen storage system of claim 10 wherein said liquid phase hydrogen feed includes a conduit and a valve that enables said liquid phase hydrogen flow through said conduit.

13. The hydrogen storage system of claim 12 wherein said check valve enables fluid communication from said hydrogen supply feed to said liquid phase hydrogen feed at a point upstream of said valve when said pressure within said hydrogen supply feed is greater than said threshold pressure.

14. The hydrogen storage system of claim 10 wherein said heat is transferred from said gas phase hydrogen feed and said liquid phase hydrogen feed, respectively.

15. The hydrogen storage system of claim 10 wherein said heat is transferred from a coolant system.

16. The hydrogen storage system of claim 10 wherein said heat is transferred from an electrical heating system.

17. The hydrogen storage system of claim 10 wherein said hydrogen supply feed further comprises a shut-off valve that is operable between an open position and a closed position to regulate said hydrogen flow.

18. The hydrogen storage system of claim 10 further comprising a safety valve that is in fluid communication with said gas phase hydrogen feed, wherein said safety valve is operable to reduce a storage pressure when said storage pressure exceeds a tank threshold.

* * * * *